Figure 1:
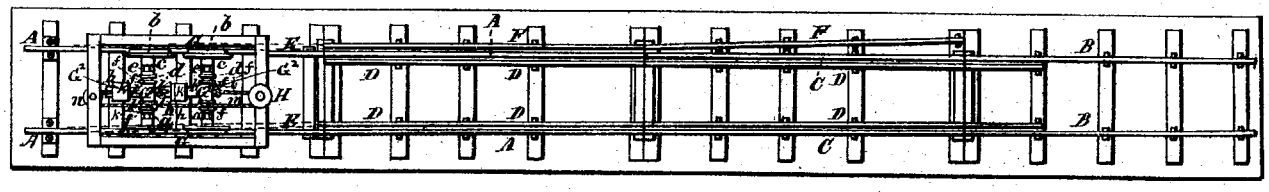

C. D. TISDALE.

Changeable Gage Car-Trucks.

No. 5,382. Reissued April 29, 1873.

Witnesses R. H. Eddy
A. P. Hale Jr.

Inventor
C. D. Tisdale

AM. PHOTO-LITHOGRAPHIC CO. N.Y. (OSBORNE'S PROCESS.)

UNITED STATES PATENT OFFICE.

CHARLES D. TISDALE, OF BOSTON, MASSACHUSETTS.

IMPROVEMENT IN CHANGEABLE-GAGE CAR-TRUCKS.

Specification forming part of Letters Patent No. 37,889, dated March 10, 1863; reissue No. 5,382, dated April 29, 1873; application filed August 19, 1870.

*To all whom it may concern:*

Be it known that I, CHARLES D. TISDALE, of Boston, in the county of Suffolk and State of Massachusetts, have invented a new and useful Mode of Applying Cars to Railroad-Tracks of Different Gages; and I do hereby declare that the following, taken in connection with the drawing which accompanies and forms part of this specification, is a description of my invention sufficient to enable those skilled in the art to practice it.

Figure 3:
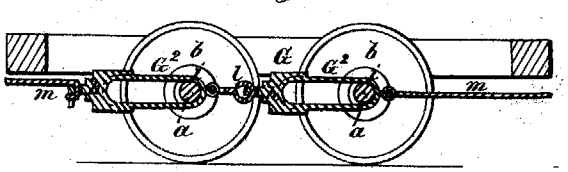
Figure 5:
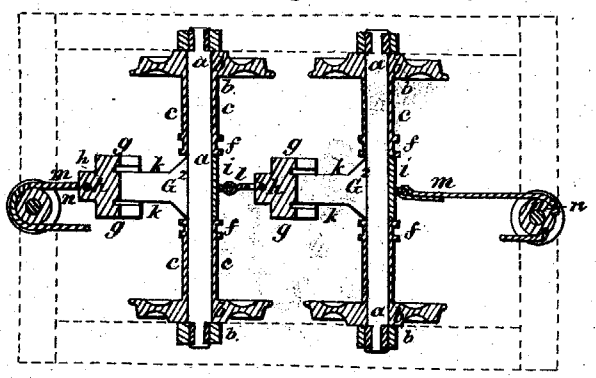
Figure 2:
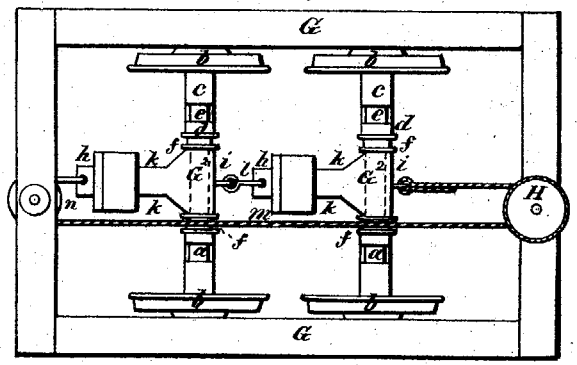
Figure 4:
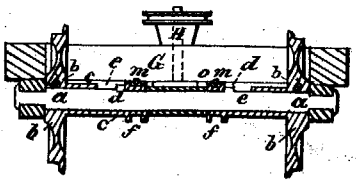

Figure 1 is a top view of a carriage and two tracks of different gages having my invention applied to them. Fig. 2 is a top view of the carriage; Fig. 3, a vertical and longitudinal section of it. Fig. 4 is a transverse section taken through one of the axles and its two wheels. Fig. 5 is a horizontal section taken through the two axles.

In the said drawing, A A and B B denote the respective rails of two railway tracks of different gages, the track A A being of broader gage than the track B B. Between the adjacent ends of the two tracks A A and B B are laid a pair of connecting rails, C C, which I term a "changing track," each rail C connecting the rail A on the same side of the track with the adjacent rail B. Inside of each change-rail C and parallel to it is a guard-rail, D, located at the distance of the thickness of the wheel-flange from the adjacent rail C. Furthermore, a switch, E E, is arranged in the broad-gage track and close to the rails D D. There is also an extra broad-gage track-rail, F, arranged parallel with one of the guard-rails D, and extending from the switch down to the narrow-gage track B B, as shown in Fig. 1. The truck or carriage is exhibited at G, it having two axles, *a a*, and two wheels, *b b*, to each axle. The journals of these axles are to be supported in suitable boxes, and are to revolve freely therein. Each wheel instead of being fastened to the axle, is attached to a sleeve or tube, *c*, which encompasses and slides freely on the axle, in the direction of its length, but is prevented by suitable means from revolving on and independently of the axle. The means may be a "feather-connection," or may consist of a projection, *d*, extending from the axle and into a notch or recess, *e*, made lengthwise in the tube or sleeve. Furthermore, each tube or sleeve is constructed with a groove, *f*, extending entirely around it and near to its inner end, as shown in Figs. 1, 2, and 4. Between the sleeves of each axle there is a yoke or frame, $G^2$, formed as shown in the drawing. These yokes with the grooves *f* of the sleeves constitute what may be termed "the wheel-locking mechanism," the object of which is not only to maintain the wheels in their proper positions, (whether running on either of the two tracks A A B B,) but to permit them to be adjusted for either by means of the rails C C D D. Each yoke has two projections, *g g*, arranged in its tail part *h*, as shown in Fig. 5. They are to enter the grooves of the axle and keep the sleeves at such a distance apart as they will be when the wheels are on the track of the narrow-gage. The head part *i* of the yoke clasps the axle, as shown in Fig. 3, and has a width which, when the head part is directly between the two sleeves, will cause it to keep the wheels in their proper positions for them to run on the track of broader gage. Between its head and tail parts *h i* each yoke is notched on its opposite sides, as shown at *k k*. The two yokes are linked together, as shown at *l*, and from the tail part of one of them a rope, *m*, extends toward and around a sheave or wheel, *n*, and from thence around the barrel *o* of a hand-windlass, H, from whence the said rope extends toward and is fastened to the head part of the other yoke. The windlass H and sheave *n* are arranged at opposite ends of the truck G.

The above constitutes my invention, the operation or mode of operation of which may thus be described: If the carriage be supposed to be on the track A A, and we wish to transfer it to the track B B of narrower gage, the rails of the switch being in correspondence with the broader-gage track-rails A A, while the carriage may be on that part of the track A A which has the parallel rails D D between its rails, the two yokes should be moved so as to bring the notches *k k* of them directly over their respective axles. Under these circumstances the sleeves will be free to slide on the axles while the carriage is passing over the deflecting or change rails C C, which, while the carriage may be moving on them, gradually force the wheels of each axle to approach one another until they may reach the proper distance apart for them to travel on the track of the narrower gage. As soon as the four wheels may have entered upon the track of narrower gage, the yokes are to be moved so as to lock the wheels at their proper distances asunder. The carriage may also be changed from the track B B to the track A A, of broader gage, in which case the guide-rails D D will operate to press apart the wheels of each axle. In either change the rails D D also operate to maintain the wheels on the rails A A or C C, while the carriage may be running on such. The purpose of the switch E and the auxiliary rail F is to allow carriages adapted to the track A A to be run down to the track B B, and be hitched or connected with a carriage or train standing on the latter track.

By the use of my invention it will be obvious that the same cars may not only be adapted to run upon either a wide or a narrow-gage track; but that the change of the cars from track to track may be made without raising them from the rails, the arrangement and position of the change-rails effecting the required lateral movement of the wheels upon their axles by the movement of the cars over the rails.

I claim—

1. In combination with the rails C C uniting the tracks A A and B B, the switch E E, substantially as shown and described.

2. In combination with the wheel-changing rails and switch, the extra broad-gage track-rail F, arranged and operating substantially as described.

3. A car, for running upon tracks of different gage, having in combination with rotary axles incapable of end movement, wheels sliding upon the axles, and the mechanism for locking the wheels in respective positions to run upon either a wide or narrow gage, substantially as described.

4. The peculiar wheel-locking mechanism, consisting of the two yokes G G, and the wheel-tubes made and applied to the axles substantially in the manner as hereinbefore specified.

C. D. TISDALE.

In presence of—
HENRY A. MAY,
HERBERT MERRITT.